(12) United States Patent
Lockwood, Jr.

(10) Patent No.: US 7,600,368 B2
(45) Date of Patent: Oct. 13, 2009

(54) HIGH COMPRESSION GAS TURBINE WITH SUPERHEAT ENHANCEMENT

(75) Inventor: Hanford N. Lockwood, Jr., San Mateo, CA (US)

(73) Assignee: Integrated Power Inc., Carson City, NV (US)

( * ) Notice: Subject to any disclaimer, the term of this patent is extended or adjusted under 35 U.S.C. 154(b) by 324 days.

(21) Appl. No.: 11/773,273

(22) Filed: Jul. 3, 2007

(65) Prior Publication Data

US 2008/0014079 A1  Jan. 17, 2008

Related U.S. Application Data

(62) Division of application No. 10/752,868, filed on Jan. 6, 2004, now Pat. No. 7,254,951.

(60) Provisional application No. 60/438,570, filed on Jan. 7, 2003.

(51) Int. Cl.
    *F02C 1/06* (2006.01)
(52) U.S. Cl. ........................ 60/39.17; 60/774
(58) Field of Classification Search ................ 60/39.17, 60/791, 774
    See application file for complete search history.

(56) References Cited

U.S. PATENT DOCUMENTS

| | | | | | |
|---|---|---|---|---|---|
| 1,988,456 | A | * | 1/1935 | Lysholm | 60/774 |
| 2,242,767 | A | * | 5/1941 | Traupel | 60/39.17 |
| 2,407,166 | A | * | 9/1946 | Kreitner et al. | 60/774 |
| 2,755,621 | A | * | 7/1956 | Terrell | 60/792 |
| 3,765,170 | A | * | 10/1973 | Nakamura | 60/39.17 |
| 6,202,399 | B1 | * | 3/2001 | Frutschi | 60/773 |
| 2002/0148213 | A1 | * | 10/2002 | Yu | 60/806 |

* cited by examiner

*Primary Examiner*—Michael Cuff
*Assistant Examiner*—Vikansha S Dwivedi
(74) *Attorney, Agent, or Firm*—Townsend and Townsend and Crew, LLP

(57) ABSTRACT

A system and method for adding superheat to the hot process gas at the discharge of a compressor drive turbine of a high compression ratio gas turbine or aviation gas turbine. The superheat brings the temperature ratio (T2/T1) of the power output turbine into equality with the pressure ratio $(P2/P1)^{(K-1)/K}$ to effect a highly efficient and adiabatic isentropic expansion across the power output turbine. The added superheat contributes to the output power of the engine less any inefficiency of the output power turbine. All of the variables are brought together to develop the proper superheat levels for obtaining the greatest power output possible at minimum fuel consumption levels.

9 Claims, 7 Drawing Sheets

HIGH COMPRESSION GAS TURBINE WITH SUPERHEAT ENHANCEMENT

CROSS REFERENCE TO RELATED APPLICATIONS

The present application is a divisional application of and claims benefit of priority to U.S. Non-Provisional application Ser. No. 10/752,868, filed Jan. 6, 2004 now U.S. Pat. No. 7,254,951, which claims priority to U.S. Provisional Application No. 60/438,570, filed on Jan. 7, 2003, which are incorporated by reference herein in their entirety.

FIELD OF INVENTION

This invention relates to improvements to the design and performance of aviation, aeroderivative, and mainframe gas turbines which use natural gas or light fuel oils as a source of fuel. It also relates to modern gas turbines with a compression ratio greater than 10:1 in the compressor element and to dual shaft gas turbines where superheat can be added to the gas stream prior to its expansion in the power output turbine and where a significant increase in power and efficiency can be obtained.

BACKGROUND OF THE INVENTION

The modern gas turbine is an energy producing system based on the Brayton Cycle. The basic unit consists of a compressor which takes ambient air and increases its pressure and temperature, a combustion chamber where the pressurized gas temperature is increased to a higher level through the combustion of fuel, and an expansion turbine where the hot pressurized gas is expanded and cooled resulting in the output of work. Some of the work performed by the expansion turbine is used to drive the compressor and the remaining work is used to turn a generator, turn a reduction gear, compress a gas, or in the case of a jet aircraft engine becomes the thrust used for propulsion.

Over time, the gas turbine has been improved, and the single shaft turbine has evolved into a two-shaft version where the compressor combustion chamber and high pressure turbine to drive the compressor are on one shaft, while the power output turbine is on a separate shaft which in turn drives the generator, gear box, or in the case of aircraft engines, the high ratio bypass fan. Since a gas turbine is a constant combustion engine, the heat resistance of the materials that make up the engine components has limited the thermodynamic cycle temperatures. With modern materials and localized cooling, modern gas turbines have been able to achieve combustor outlet temperatures approaching 2500° F. However, the localized cooling also bleeds off some of the compressed air and in turn can reduce the engine efficiency.

Other attempts have been made to improve the Brayton Cycle efficiency by adding additional steps to the cycle. One of these steps includes interstage cooling of the air in the compressor. In this process, air is removed from the compressor and passed through a heat exchanger where some of the heat of compression is removed. Then the air is reinjected into the next compressor stage for further compression. Interstage cooling can be performed on one or more stages of a single compressor or between two compressors where they are connected in series.

Another addition to the Brayton Cycle that is used to improve the cycle efficiency is regeneration. Regeneration requires the installation of a heat exchanger that takes the compressed air from the compressor outlet and increases its temperature prior to the compressed air entry into the combustor. The heat to increase the compressed air temperature comes from the exhaust gas from the last turbine in the engine. The energy used to heat the compressed air is recovered from the exhaust stream and increases the overall system efficiency. It also improves the efficiency of the gas turbine when it is operating at less than full power. Regenerators are usually used on low pressure compressors because high pressure compressors have such high outlet air temperatures that there is not enough differential temperature between the compressor outlet and the turbine exhaust stream to make heat recovery practical.

The Brayton Cycle performance can also be improved by adding reheat to the pressurized hot air as it passes through the various expansion phases of the compressor drive turbine, the power output turbine, or in the special case of jet aircraft engines, the afterburner where the additional energy is used to increase jet thrust. The process of adding reheat is far more complex than just adding additional fuel, because as additional fuel is added, the oxygen content of the pressurized hot air is diminished until the flammability limits are reached and the air will no longer support the combustion process. In many cases, the prior art describes reheat processes which cannot be achieved either because there is insufficient oxygen in the pressurized air or even if the remaining oxygen were to be consumed, the flame temperature would never be high enough to meet the performance claims of the engine.

An analysis of the prior art finds eighteen U.S. patents which discuss reheating of the process gas between expansion turbines. These patents can be grouped into three classes which describe their primary teachings. The first class is designed to use process gas reheat in a gas turbine that has a regeneration system in it. These turbines are usually small in capacity and are outside the scope of this invention. U.S. Pat. No. 2,242,767 to Traupel shows a regeneration unit used on a gas turbine with interstage reheat on the compressor drive turbine, U.S. Pat. No. 2,407,166 to Kreitner et al. shows a regeneration unit with a compressor with interstage cooling and a turbine with interstage reheat, U.S. Pat. No. 2,755,621 to Terrell in FIG. 3 shows a hot gas valving system for pressure control in a turbine with reheat and a regeneration system, and U.S. Pat. No. 3,054,257 to Schelp shows a small gas turbine for vehicles which has process gas reheat and two regeneration units in a single gas turbine unit. None of these units use superheat to bring the power turbine into adiabatic isentropic balance to optimize the power output.

The second class of patents which teach of the advantages of process gas reheat are the single shaft turbine units. In each of these patents, there are one or more shafts that contain a compressor unit, a combustor unit, and an expansion turbine on the same shaft. In each of these gas turbines, the efficiency gains of using superheat described in this invention are lost on a turbine which is mounted on the same shaft as the compressor unit. Patents which belong to this class include: U.S. Pat. No. 1,988,456 to Lysholm shows a single compressor with a water cooled combustor feeding hot process gas to two of four expansion turbines that have reheat combustors and are mounted on a single shaft. U.S. Pat. No. 2,504,181 to Constant shows an aircraft turbine with two shafts mounted end to end and each shaft has a compressor, a combustor, and a turbine. U.S. Pat. No. 3,765,170 to Nakamura shows a dual shaft gas turbine with each shaft having a different capacity and consisting of a compressor, a regenerator, a combustor, and a turbine. U.S. Pat. No. 3,867,813 to Leibach shows in FIG. 2 an aviation engine with three concentric shafts each with a compressor and a turbine mounted thereon with a single combustor to normally drive two of the shafts and an intermittent reheat combustor to drive the low pressure compressor and turbine unit. U.S. Pat. No. 5,313,782 to Frutschi et al. shows a gas turbine in combination with a steam power unit where the gas turbine consists of either two compressors with intercooling, a combustor, a power turbine, a reheat combustor, and a second turbine on a single shaft, or the same compressors and turbines mounted on two concentric shafts respectively. U.S. Pat. No. 5,347,806 to Nakhamkin shows a gas turbine power plant with two or more compressors, intercoolers, combustors, and turbines all cascaded together with a regenerator to improve efficiency. U.S. Pat. No. 5,454,220 to Althaus et al. shows a single shaft turbine unit which has a compressor, a primary combustion chamber, a turbine, an auto-ignition reheat combustion section, and a second turbine. U.S. Pat. No. 5,465,569 to Althaus et al. shows a single shaft turbine unit which has a compressor, a primary combustion chamber, a turbine, a reheat combustion chamber, and a second turbine where the fuel flow to the reheat combustion chamber is used to modulate higher end power settings. U.S. Pat. No. 5,577,378 to Althaus et al. shows a single shaft turbine unit which has a compressor, a primary combustion chamber, a gas turbine, an auto-ignition reheat combustion section, a second gas turbine, and a steam turbine. U.S. Pat. No. 6,079,197 to Attia shows a gas turbine system consisting of a low temperature compressor, a combustor, and a high pressure turbine on a single shaft plus a high temperature compressor, a reheat combustor, and a low pressure turbine on a single shaft or the two turbine units all mounted on one shaft. In each case, the patents listed above show the reheat energy applied to a turbine which is mounted on the same shaft with a compressor which does not apply to the new invention.

The third class of patents which teach the advantages of process gas reheat are the special units. These patents are for unique processes which are different from those included in this invention. U.S. Pat. No. 4,206,593 to Su et al. shows a gas turbine with a compressor, a combustion chamber, a first turbine, a reheat combustor of a venturi design, and a second turbine all mounted on a single shaft. U.S. Pat. No. 4,885,912 to Nakhamkin shows a power system where air is compressed, stored and then released to a recuperator where it is heated and expanded in a high pressure turbine without combustion. Then the air is mixed with fuel and combusted where it is expanded in a low pressure turbine and exhausted to the recuperator. U.S. Pat. No. 5,133,180 to Homer et al. shows a gas turbine consisting of a compressor, a combustion chamber, and a compressor drive turbine on a shaft. A second shaft has a power output turbine. A reformer is integrated into the system to provide fuel to the primary combustor. The power output turbine provides hot gas to the reformer and does not have reheat (col. 3, lines 12-17). U.S. Pat. No. 5,184,460 to Franciscus et al. shows a two-shaft aviation turbine with a compressor, a first combustor, a first turbine, a second combustor, a second turbine on one shaft and a fan, a third combustor, a third turbine, a fourth combustor, and a fourth turbine on the second shaft. All the combustors operate at the same temperature of 2800° R.

All the patents in the special class can be distinguished from this invention because they do not address the complex relationship between superheat temperature, process gas pressure, flammability limits, and material temperature limits. All of the variables are brought together in this invention to develop the proper superheat levels to obtain the greatest power output possible at minimum fuel consumption levels.

SUMMARY OF THE INVENTION

The present invention is a method for improving the performance of high output gas turbine engines using the proper level of gas superheat to augment the engine energy levels at the power output turbine inlet. The gas turbine engine that could obtain the best performance increase from this invention is a dual shaft design where the air compressor, primary combustor, and compressor drive turbine are located on one shaft, while the superheat combustor and the power output turbine are located on a separate power output shaft. Also the best results will be obtained using gas turbine compressors designed with a compression ratio of 10:1 or greater.

An analysis of the thermodynamics of the dual shaft gas turbine shows that the energy used to compress the air for combustion in the primary combustion chamber is equal to the power output of the compressor drive turbine. The hot gas from the combustor enters the compressor drive turbine where the hot gas goes through an adiabatic isentropic expansion. Since the compressor consumes almost two-thirds of the available power available in the hot gas stream and the materials in the combustor limit the hot gas temperature, the hot gas does not have enough temperature to allow a full adiabatic isentropic expansion in the power output turbine. As a result the temperature and pressure which define the energy level of the exhaust gas from the compressor drive turbine must be augmented by adding superheat to bring the hot gas to the proper temperature which corresponds to the available pressure, so that the hot gas can go through another full adiabatic isentropic expansion in the power output turbine to obtain the optimum power output of the engine. The remaining energy contained in the power turbine outlet flow is the energy rejected in the exhaust from the gas turbine engine. The exhaust gas flow is at atmospheric pressure and has a temperature which defines the energy lost to the system.

In all thermal engine cycles, there is some type of work done to prepare the engine fluid in the first phase of the cycle. In the case of a piston engine or a gas turbine, there is a compression phase. In a steam plant the feed water is pressurized prior to being injected into the boiler. In the second phase of the cycle, heat is added to the fluid through combustion either directly as in the piston engine and gas turbine or indirectly as in the case of the boiler. The heated and pressurized fluid is then expanded and cooled in the engine during the third phase to provide mechanical work. In all cases about two-thirds of the mechanical work is used to drive the compressors or pressurize the feed water in support of the engine cycle. The remaining one-third of the mechanical work is used to provide external work such as to generate power or operate a mechanical drive. The engine fluid with some heat content is then exhausted from the system in the fourth phase of the cycle. In these engines if the intent is to increase the power output of the engine, then sufficient energy or three times the required output must be added to the system with two-thirds allocated towards the compression of the engine fluid to obtain the desired increase in output power. In this case the mass flow of fluid through the engine will be increased and so will the mass and heat content of the exhaust.

Along with the temperature and pressure, the energy level in the exhaust gas is also determined by the mass flow of the exhaust stream in a gas turbine. The majority of the mass flow comes from the air passing through the turbine compressor. In the combustor, fuel is added during the combustion process which increases the mass flow by a small percentage. In a typical gas turbine, the air flow would be 149.36 lbs. per second while the fuel would be 2.64 lbs. per second if the fuel was natural gas. The fuel mass is less than 2 percent of the mass of the air flowing through the gas turbine engine.

In a very few cases, and a gas turbine is one of them, it is possible to increase the power output from the engine by adding additional energy to the engine fluid downstream of the compressor drive turbine that brings the temperature and pressure into proper balance for adiabatic isentropic expansion in such a way that a much higher percentage of the additional energy added to the system is turned into useful work. In the example where the gas turbine has an air flow of 149.36 lbs. per second, the primary combustion chamber has 2.64 lbs. per second of natural gas fuel and has a power output of 22.8 megawatts. If additional fuel is added to the air downstream of the compressor drive turbine, then the work output can be increased. In this example, adding 0.71 lbs. per second of additional natural gas fuel can increase the engine output to 33.9 megawatts and adds less than 0.5 percent to the total engine mass flow. The only losses are due to a slight increase in the power turbine exhaust temperature and the mechanical efficiency of the power turbine itself.

In this invention, superheat is introduced into the hot gas between the compressor drive turbine and the power output turbine which adds to the available energy in the hot gas stream but does not add significant energy to the exhaust. As a result a much higher percentage of the superheat energy is turned into useful work in the power turbine than is lost in the exhaust stream. This in turn increases the total work available from the gas turbine and increases the system's total efficiency.

Adding superheat between the compressor drive turbine and the power output turbine to obtain additional power output efficiently can only be achieved with higher hot gas pressure downstream of the compressor drive turbine. In this invention three gas turbine designs will be discussed to demonstrate the features of this invention. The first is Engine A, which is similar to a commercial gas turbine and has an output capacity of 22.8 megawatts or 30,574 HP. It has a compression ratio in the compressor of 18.8:1 and an exhaust flow rate of 152 lbs. per second. It also has a pressure ratio of 6.2:1 (91.09 lbs. per sq. in.) at the discharge of the compressor drive turbine and has an overall efficiency of 36.79 percent. The second is Engine B, which is also similar to a commercial gas turbine and has a capacity of 29.1 megawatts or 38,995 HP. Engine B has a compression ratio in the compressor of 23.1:1 and an exhaust flow rate of 182.7 lbs. per second. Engine B also has a pressure ratio of 6.87:1 (100.98 lbs. per sq. in.) at the discharge of the compressor drive turbine and has an overall efficiency of 39.18 percent.

Engines A and B were evaluated at various temperatures to determine how they would perform. The optimum superheat temperature for each engine was determined to be a rise of 350° F. between the compressor drive turbine and the power output turbine. In the case of Engine A the output capacity increases from 22.8 megawatts to 33.9 megawatts or 45,514 HP with an increase in overall efficiency from 36.79 percent to 43.44 percent. In the case of Engine B the output capacity increases from 29.1 megawatts to 43.1 megawatts or 57,739 HP with an increase in overall efficiency from 39.18 percent to 46.0 percent.

A third gas turbine Engine C is similar to Engine B and is designed to add only enough energy into the primary combustion chamber to drive the compressor, and it has far less performance than Engines A and B. Engine C, which is not a practical design and is included to demonstrate that the prior art will not work, has an output capacity of 14.8 megawatts or 19,804 HP. Engine C has a compression ratio in the compressor of 23.1:1 and an exhaust flow rate of 181.12 lbs. per second. Engine C also has a pressure ratio of 4.1:1 (60.36 lbs. per sq. in.) at the discharge of the compressor drive turbine and an overall efficiency of 38.8 percent. This is half the capacity of Engine B.

To evaluate Engine C with superheat, sufficient fuel is burned in the superheat combustion chamber to raise the temperature of the hot gas to the same level as in Engine B after the 350° F. superheat. This means that Engine C will have a 1041° F. superheat. The performance of Engine C increases to 27.0 megawatts or 36,402 HP and the overall efficiency drops to 28.99 percent. Even with the superheat, Engine C has less capacity than Engine B without superheat.

The analysis of the pressure ratios of the three engines demonstrates that the pressure of the hot gas at the compressor discharge is critical to performance of a gas turbine with superheat. The higher the compressor discharge pressure the better the engine will perform with superheat. This means that the compression ratio of the compressor should be as high as possible and the pressure at the outlet of the compressor drive turbine should be as high as possible. This is contrary to the teachings contained in U.S. Pat. No. 5,184,460 to Franciscus et al. where they state that reheat allows them to reduce the temperature in the primary combustion chamber from 3260° R to 2800° R and increase the power output of their engine.

Another feature of this invention is that the optimum superheat temperature is low. This means that the superheat temperature can be achieved within the flammability limits of the compressor turbine exhaust stream. As an example, in the case of Engine B, the percentage of oxygen in the hot gas from the primary combustion chamber would be 14.9 percent by volume. After adding 350° F. superheat to the superheat combustor at the compressor turbine discharge, the oxygen content of the hot gas would be 13.3 percent by volume. Because the expansion of the hot gas from the primary combustion chamber through the compressor drive turbine reduces the heat content of the hot gas, the combustion process is stepped between the two combustion chambers which reduces peak flame temperatures and $NO_x$ formation.

The lower superheat temperature to obtain optimum turbine performance also means that the power output turbine blades will not require special cooling. These turbine blades are much larger than the blades in the compressor drive turbine, so they would be more difficult to cool. Also this allows the addition of the superheat combustion chamber for the superheat system to be added to some current gas turbine engine designs. It might be an added feature on older engines during overhaul or in some cases as a bolt-on kit. The addition of the superheat combustor will greatly increase the gas turbine power output, but not increase the weight of the engine by a significant amount.

The superheat combustor has a low pressure drop compared to the primary combustion chamber in a gas turbine. The superheat combustion chamber will have a bluff body which creates a flow eddy to anchor the flame front of the superheat flame. This can be achieved by using a pressure drop of from 2 inches WC to 20 inches WC depending on the superheat combustor design. The primary combustion chamber has a much higher pressure drop due to diffusion loss from reducing the air velocity from the compressor discharge, the friction loss of the air passing through the combustor, and the momentum loss as the air is accelerated downstream into the compressor drive turbine. The primary combustor can have losses from 3 to 8 percent of the compressor static pressure. The superheat combustor is much lower in capacity, does not see the diffuser effects from the compressor, and does not require the mixing energy to even out the temperature profile of the superheated hot gas. Also the superheat combustion is initiated in an environment where the compressor drive turbine outlet temperature (1550° F.) is almost two times the compressor discharge temperature (850° F.).

The superheat combustor will normally be operating above the auto-ignition temperature of the fuel injected into the superheat combustor, so an ignition source would normally not be required. However, in this invention, an ignition source will be required to provide the operator with positive control over the use of the superheat and to allow superheat to be initiated at less than full load on the gas turbine. Operations of the turbine at less than full load may lower the temperature at the compressor turbine discharge to the point where auto-ignition of the superheat fuel is not assured.

A further innovation of the superheated gas turbine comes from the selection of fuels. The primary combustor is usually fired with natural gas and/or light fuel oils. The combustor pressure is very high, so the fuels must be pressurized to a pressure greater than the pressure in the combustor. The superheat combustor operates at almost one-third the pressure of the primary combustor, so less fuel pressure is required. Also the fuels in the primary combustor may be different from the fuel in the superheat combustor of the same gas turbine. The lower pressure of the superheat combustor means that waste gas or low BTU gas or light waste oils can be burned in the superheat combustor while the primary combustor burns pressurized natural gas or light oil.

Because of the lower combustor temperature and pressure in the superheat combustor, there may be applications of this invention where the superheat may be applied to the gas turbine from an indirect heat source. In this case, the primary combustor would fire on pressurized natural gas or light fuel oil while the heat for the superheat process might come from a heat exchanger which has a process heat source providing indirect heating to the gas turbine process gas downstream of the compressor drive turbine. The process heat source can come from an industrial or utility process where the process heat can be recovered to increase the capacity of the gas turbine system.

A very rare version of this heat recovery system could include a gas turbine with superheat where the primary heat source and the superheat source can both be provided through indirect heating systems. In this case the primary combustor and the superheat combustors would both be replaced by heat exchangers which are designed to provide indirect heat to the turbine. At the proper temperature and pressures, it is likely that in such an application the superheat heat exchanger will be upstream of the primary heat exchanger, because the superheat heat exchanger will have approximately one-third the pressure of the primary heat exchanger. This lower differential pressure across the heat exchanger tubes will simplify the design of the highest temperature heat exchanger.

Once the hot waste process gas has some of its heat absorbed by the superheat heat exchanger, then the hot waste process gas can go on to the primary heat exchanger where the very high pressure differential can be designed into a heat exchanger with lower temperature extremes on the hot waste process gas side. In the design of the indirect fired gas turbine, the heat applied to the primary heat exchanger must result in the same temperature and pressure at the compressor discharge as is found in the direct fired unit. The superheat heat exchanger must also reproduce the same temperature and pressure profile at the discharge of the superheat heat exchanger as would be obtained from the direct firing of the reheat combustor. It is also desirable to design one or two of the heat exchangers so that they have a minimum volume of gas turbine hot gas in order to reduce the response time of the turbine to power setting charges. It is also possible to have an indirect fired primary heat source and a direct fired superheat heat source.

The key part of this invention, given the limitations of mechanical losses, blade temperatures, flammability limits and turbine hot gas pressures and temperatures at the exit of the compressor drive turbine, is the development of the ideal amount of superheat that can be applied to get the optimum performance out of the engine.

None of the prior art patents discuss how to develop the maximum performance from a gas turbine if superheat is properly added.

The goal of adding superheat is to obtain the highest percentage of useful work from the added energy. This means that the superheat should be added to the system at the turbine that produces the output work. The superheat must add a minimum of mass to the air passing through the turbine so the superheat should be exclusively a fuel source which adds minimum mass to the gas stream or the indirect addition of heat alone to the turbine gas stream.

A detailed analysis of the compressor drive turbine outlet conditions for Engines A and B of this invention shows that Engine A has a gas flow rate of 152 lbs. per second at a temperature of 2030° R and a pressure of 91.09 lbs. per sq. in., while Engine B has a flow rate of 182.7 lbs. per second at a temperature of 2025° R and a pressure of 100.98 lbs. per sq. in. Both of these engines will achieve their optimum performance with reheat if the gas from the compressor drive turbine temperature is increased by approximately 350° F.

The power output drive turbine for each of these engines is similar; however, due to the pressure difference at the discharge of the compressor drive turbine, Engine A has a power output drive efficiency of 70 percent while Engine B has a power output drive efficiency of 72 percent. This means that 70 percent of the incremental increase in the power output of Engine A due to the addition of the 350° F. superheat will become useful power while the remaining 30 percent of the energy will add to the exhaust. In the case of Engine B, 72 percent of the incremental increase in power output goes to useful work and 28 percent will add to the exhaust. If the output drive turbines in these engines were more efficient than 70 and 72 percent respectively, then even more output power would be available to do useful work.

One indicator that the 350° F. superheat is the correct amount can be obtained by comparing the actual engine performance with the theoretical prediction. In the case of Engine A, the actual compressor drive turbine exit temperature is 2030° R and the actual power turbine exhaust temperature is 1506° R. The difference between them is 524° F. The theoretical compressor drive turbine exit temperature is 2030° R and the theoretical power turbine exhaust temperature is 1272° R. The difference between them is 758° F. If we take the difference between 758° F. and 524° F., we get 234° F. Dividing 234° F. by 0.70 (the efficiency of the power turbine) we get 334° F. which is slightly less than the 350° F. predicted to be the optimum superheat temperature. The significant finding from this analysis is that the superheat adds back the energy to overcome the mechanical losses that the output turbine lost in the original cycle.

This invention can be applied to all types of gas turbine engines, including gas turbines used in aviation. The main advantage gained from the power and efficiency increase results in a reduction of the size and weight of the engine core to achieve the current power output. It is estimated that an aviation gas turbine with a high ratio bypass fan that uses the superheat technology of this invention could save 25 percent of the engine weight compared to a current engine with the same thrust capacity.

This invention covers the four fundamental requirements to effectively use superheat in a gas turbine engine. The first is that the superheat temperature should bring the hot gas at the power turbine inlet into adiabatic isentropic balance. In the selected examples, the superheat temperature is 350° F. The second is that the superheat must be within the flammability limits of the fuel/hot gas mixture in the superheat combustion chamber. The third is that the superheat temperature must be low enough so the power turbine blades can withstand the temperature. And the fourth requirement is that the superheat temperature must be the lowest and most efficient superheat level to obtain the optimum performance from the gas turbine engine.

BRIEF DESCRIPTION OF THE DRAWINGS

The unique advantages of the present invention will become apparent to one skilled in the art upon reading the following specification and by reference to the drawings in which.

DETAILED DESCRIPTION OF THE INVENTION

The gas turbine cycle improvements developed in this invention can be applied to many types and sizes of gas turbines that have certain design features. These features include a dual shaft design where the compressor and compressor drive turbine are on one shaft and the power output turbine is on a separate shaft. These gas turbines have a compressor compression ratio in excess of 10:1. These gas turbines do not normally have any interstage cooling in the compressor; however, if they do, it is likely to be evaporative cooling from the injection of limited amounts of atomized water. These turbines are a design which can either be redesigned or modified to add the superheat capability which will improve both the gas turbine power output and the cycle efficiency.

This invention provides an improvement in the power output of a gas turbine by adding pure energy to the system downstream of the compressor drive turbine where the efficiency of the incremental addition of energy is very high. Also the energy is added to the turbine in the form of heat which has a minimal increase in the mass of the hot air moving through the gas turbine engine.

Figure 1:
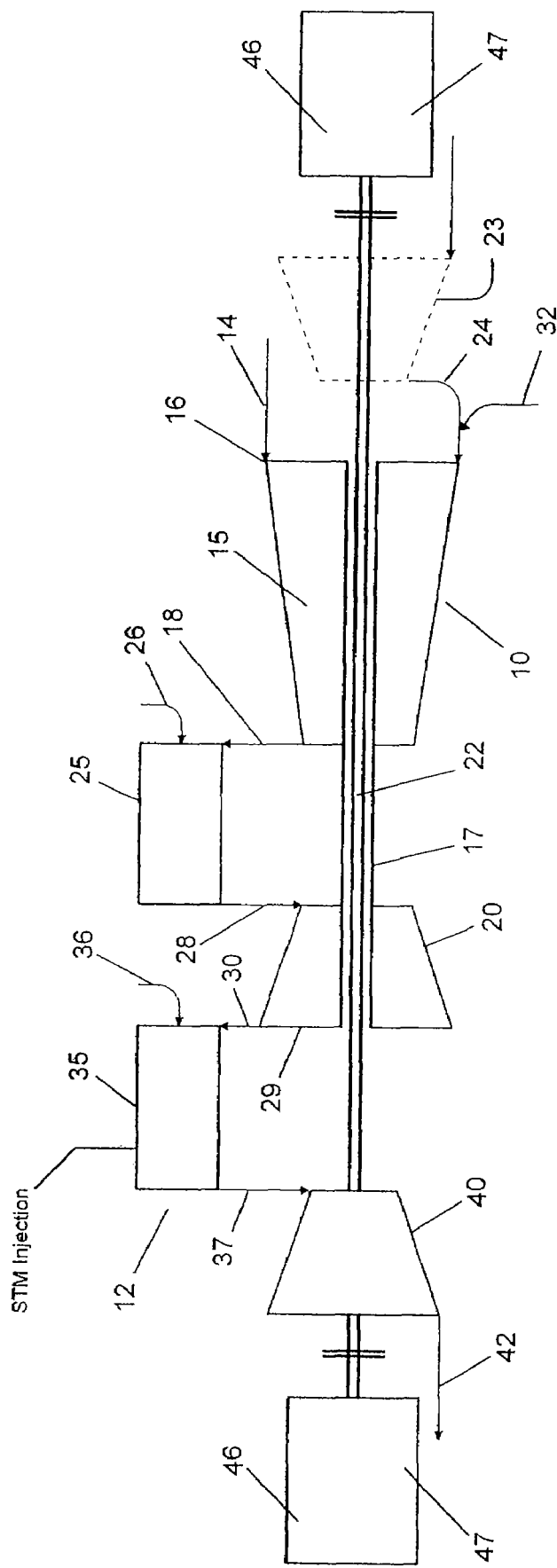
FIG. 1 is a schematic showing the elements of a dual shaft gas turbine with a superheat combustor.

FIG. 1 is a schematic of a gas turbine engine 10 which has the above features. The gas turbine engine 10 has a compressor 15 which is connected to a compressor drive turbine 20 through a shaft 17. The compressor 15 takes air 14 into the compressor inlet 16 where the air pressure is increased by a factor of greater than 10:1 and at the same time the air temperature is also increased. The hot air 18 discharging from the compressor 15 is introduced into the combustor 25 where it is mixed with fuel 26 and the resulting combustion process is used to increase the hot air 28 temperature to an even higher level.

The hot gas 28 from the combustor 25 enters the compressor drive turbine 20 where the hot gas 28 is expanded and cooled, providing the energy in the compressor drive turbine 20 to drive the compressor 15. The hot gas 30 from the compressor drive turbine 20 still has additional energy in the form of pressure and temperature which would normally be sent directly to the power output turbine 40 where the output power of the gas turbine 10 is extracted in the form of thrust 45, electrical power 46, or mechanical power 47 prior to the hot gas 50 being vented to the atmosphere.

In this invention, the hot gas 30 from the compressor drive turbine 20 exhaust 29 is sent to a superheat combustion chamber 35 where additional fuel 36 is added to increase the temperature of the hot gas 37 until it reaches the corresponding temperature that is required to match the pressure differential between the inlet pressure to the power output turbine 40 and the outlet pressure of the power output turbine 40. This will cause the power output turbine 40 to extract the maximum amount of energy from the hot gas stream 37 under the adiabatic, isentropic (constant entropy) process. The ratios of the absolute temperatures compared to the ratio of the absolute pressures are shown by the following equation:

$$T2/T1 = (P2/P1)^{K-1/K}$$

where T is the absolute temperature and P is the absolute pressure. K is the ratio of the specific heat constant pressure divided by the specific heat constant volume.

In a modern single cycle gas turbine 10 where the compression ratio in the compressor 15 is very high, heat is added to the compressor discharge air 18 to raise the temperature as high as possible to extract the maximum work from the hot gas stream. The heat added is limited by the materials in the combustor 25 and the materials in the downstream stationary nozzles and turbine blades. The hot gas 28 stream goes through an adiabatic isentropic expansion in the compressor drive turbine 20 where work is extracted to drive the compressor 15. The compressor 15 and the compressor drive turbine 20 are usually very efficient machines that reduce the hot gas 28 pressure and temperature in proportion to the ratios shown in the above equation. Because the heat input to the hot gas 18 at the compressor 15 discharge is limited by the materials in the engine, the exhaust gas 30 from the compressor drive turbine 20 will not contain enough heat in relation to the discharge pressure to obtain the full power that would be available from the further adiabatic isentropic expansion of the hot gas 37 in the output drive turbine. In this invention, the correct amount of superheat is added in the superheat combustor 35 to elevate the hot gas 30 discharge from the compressor drive turbine 20 exhaust to the proper level for the specific hot gas 30 pressure, so that the additional adiabatic isentropic expansion of the hot gas 37 in the power output turbine can achieve the optimum performance.

To further illustrate the features of this invention, three gas turbine 10 engine designs will be analyzed. The first unit is Engine A, which is a gas turbine 10 with a power output of 22,800 KWH or 30,574 HP. It has a heat input of 211 million BTUH and a compression ratio of 18.8:1. The second unit is Engine B, which is a gas turbine 10 with a power output of 29,080 KWH or 38,995 HP. It has a heat input of 253 million BTUH and a compression ratio of 23.1:1. These two engines are very similar to actual gas turbines 10 in use today, so the actual engine performance is well known. The third unit is Engine C, which is a gas turbine 10 with a power output of 14,768 KWH or 19,804 HP. It has a heat input of 130 million BTUH and a compression ratio of 23.1:1. The example of Engine C is used to show that adding excessive heat to the hot gas 30 at the discharge of the compressor drive turbine 20 will not achieve the same performance level as the superheated gas turbine 12 with the same compression ratio. Engine C is designed so that the minimum heat is added in the primary combustion chamber 25 to achieve the hot gas 28 volume and compression ratio required. The compressor drive turbine 20 exhaust is sent to the superheat combustor 35 where additional heat is added until the hot gas 37 reaches 2375° R which is the same temperature found to be the optimal superheat temperature for Engine B. Then the hot gas is expanded through the power turbine 40 for Engine C and the power output is compared to the performance of Engines A and B.

The summary of the compressor drive turbine 20 expansion and the power output turbine 40 expansion for Engines A, B and C is shown in Table 1. The compressor drive turbine 20 expansion for each engine 10 is a single curve based on specific pressure and temperature ratio differentials. Using the equation for the adiabatic isentropic expansion above, the temperature ratio differential is compared to the pressure ratio differential across the compressor drive turbine 20. If the compressor drive turbine is close to the adiabatic isentropic expansion, then the two sides of the equation should be almost equal. From Table 1, we see that Engine A has a differential of 0.0015, Engine B has a differential of 0.0019, and Engine C has a differential of −0.008. In each case the differential between the temperature drop and pressure drop across the compressor drive turbine 20 expansion is very small.

The power output turbine 40 expansion for Engines A, B and C is shown at the bottom of Table 1. Starting with the same hot gas 30 parameters of pressure and temperature that came from the discharge of the compressor drive turbine 20 for each of the engines 10, an analysis of the ideal expansion conditions is compared to the actual expansion conditions for the engines 10. Engines A and B are estimated to have power output turbine 40 efficiencies of 70 percent and 72 percent respectively which includes the losses for exhaust kinetic energy and internal ducting losses. Engine C is assigned a power output turbine 40 efficiency of 72 percent to make it as close to Engine B as possible for the purpose of this analysis. The difference between the ideal expansion conditions and the actual expansion conditions is due to the efficiency of the power output turbine 40 and its associated losses.

The analysis of the ideal expansion of the hot gas 37 through the power output turbine 40 for Engines A, B and C demonstrates that the expansion is adiabatic isentropic. Engine A has an ideal differential of 0.0003, Engine B has an ideal differential of 0.0000 and Engine C has an ideal differential of −0.0001. The analysis of the actual expansion of the hot gas through the power output turbine without superheat for Engines A, B and C shows that the temperature and pressure side of the equation is not in balance. In this case, Engine A has a differential of 0.1116, Engine B has a differential of 0.1108, and Engine C has a differential of 0.0903. Also in each of these cases, the equation is out of balance due to a lack of heat available to match the respective pressure drop in the power output turbine 40 of each engine 10.

In order to determine the optimum level of superheat that would be required to gain the best performance from the power output turbine 40 on each engine, the hot gas 30 temperature at the discharge of the compressor drive turbine 20 was increased by 200° F. in the superheat combustor 35 prior to entering the power output turbine 40. For each subsequent line, the temperature was increased by 50° F. until a superheat temperature increase of 450° F. was obtained. Examining the differential between the temperature ratio and the pressure ratio for each superheat level, the minimum differential is found at a superheat level of 350° F. Engine A has a differential at 350° F. of 0.0431 and Engine B has a differential at 350° F. of 0.0398. It is also of interest to note that the temperature differential of 761° F. for Engine A at 350° F. superheat is just slightly higher than the ideal temperature differential of 758° F. of the same engine 10 without superheat. Also the temperature differential of 805° F. for Engine B at 350° F. superheat is just slightly higher than the ideal temperature differential of 791° F. of the same engine 10 without superheat. This shows that the addition of 350° F. of superheat to the hot gas 30 discharge from the compressor drive turbine 20 on both Engines A and B will bring the temperature ratio and pressure ratio closer in agreement so that an adiabatic isentropic expansion of the hot gas can be achieved in the power output turbine 40.

TABLE 1

COMPRESSOR DRIVE TURBINE EXPANSION

|  | Combustor Discharge Temp deg R T1 | Compressor Turbine Discharge Temp deg R T2 | Temp Diff deg F. | (T2/T1) (1) | Combustor Discharge Press PSIA P1 | Compressor Turbine Discharge Press PSIA P2 | K | $(P2/P1)^{k-1/k}$ (2) | (1) − (2) |
|---|---|---|---|---|---|---|---|---|---|
| Engine A | 2655 | 2030 | 625 | 0.7646 | 276.36 | 91.09 | 1.322 | 0.7631 | 0.0015 |
| Engine B | 2714 | 2025 | 689 | 0.7461 | 339.57 | 100.98 | 1.322 | 0.7442 | 0.0019 |
| Engine C | 2070 | 1334 | 736 | 0.6444 | 339.57 | 60.36 | 1.340 | 0.6452 | −0.0008 |

POWER OUTPUT TURBINE EXPANSION

|  | Superheat | Compressor Turbine Discharge Temp deg R T2 | Power Turbine Exhaust Temp deg R T3 | Temp Diff deg F. | (T3/T2) (1) | Compressor Turbine Discharge Press PSIA P2 | Power Turbine Exhaust Press PSIA P3 | K | $(P3/P2)^{k-1/k}$ (2) | (1) − (2) |
|---|---|---|---|---|---|---|---|---|---|---|
| Engine A Ideal | 0 | 2030 | 1272 | 758 | 0.6266 | 91.09 | 14.7 | 1.345 | 0.6263 | 0.0003 |
| Actual | 0 | 2030 | 1506 | 524 | 0.7419 | 91.09 | 14.7 | 1.338 | 0.6303 | 0.1116 |
| A | 200 | 2230 | 1568 | 662 | 0.7031 | 91.09 | 14.7 | 1.332 | 0.6346 | 0.0685 |

TABLE 1-continued

|  |  |  |  |  |  |  |  |  |  |  |
|---|---|---|---|---|---|---|---|---|---|---|
|  | B | 250 | 2280 | 1584 | 696 | 0.6947 | 91.09 | 14.7 | 1.331 | 0.6349 | 0.0598 |
|  | C | 300 | 2330 | 1600 | 730 | 0.6867 | 91.09 | 14.7 | 1.330 | 0.6360 | 0.0507 |
|  | D | 350 | 2380 | 1619 | 761 | 0.6803 | 91.09 | 14.7 | 1.328 | 0.6372 | 0.0431 |
|  | E | 400 | 2430 | 1668 | 762 | 0.6864 | 91.09 | 14.7 | 1.326 | 0.6384 | 0.0480 |
|  | F | 450 | 2480 | 1717 | 763 | 0.6923 | 91.09 | 14.7 | 1.325 | 0.6395 | 0.0528 |
| Engine B | Ideal | 0 | 2025 | 1234 | 791 | 0.6094 | 100.98 | 14.7 | 1.345 | 0.6094 | 0.0000 |
|  | Actual | 0 | 2025 | 1468 | 557 | 0.7249 | 100.98 | 14.7 | 1.338 | 0.6141 | 0.1108 |
|  | A | 200 | 2225 | 1526 | 699 | 0.6858 | 100.98 | 14.7 | 1.334 | 0.6177 | 0.0681 |
|  | B | 250 | 2275 | 1541 | 734 | 0.6774 | 100.98 | 14.7 | 1.332 | 0.6189 | 0.0585 |
|  | C | 300 | 2325 | 1555 | 770 | 0.6688 | 100.98 | 14.7 | 1.330 | 0.6199 | 0.0489 |
|  | D | 350 | 2375 | 1570 | 805 | 0.6611 | 100.98 | 14.7 | 1.328 | 0.6213 | 0.0398 |
|  | E | 400 | 2425 | 1618 | 807 | 0.6672 | 100.98 | 14.7 | 1.327 | 0.6220 | 0.0452 |
|  | F | 450 | 2475 | 1663 | 812 | 0.6719 | 100.98 | 14.7 | 1.326 | 0.6227 | 0.0492 |
| Engine C | Ideal | 0 | 1334.00 | 908.00 | 426.00 | 0.6807 | 60.36 | 14.7 | 1.374 | 0.6808 | −0.0001 |
|  | Actual | 0 | 1334 | 1030 | 304 | 0.7721 | 60.36 | 14.7 | 1.371 | 0.6818 | 0.0903 |
|  | D | 1041 | 2375 | 1874 | 501 | 0.7891 | 60.36 | 14.7 | 1.324 | 0.7073 | 0.0818 |

Engine C, however, is different. Because this engine 10 was designed with the minimum heat in the primary combustion chamber 25 required to develop the volume and pressure ratio in the compressor 15 that is equal to Engine B, the primary combustion chamber 25 discharge pressure is 339.57 PSIA while the compressor drive turbine 20 discharge pressure is only 60.36 PSIA. The increase in pressure drop across the compressor drive turbine 20 is required to make up for a lack of temperature in the combustor outlet 28 which is 2070° R. The temperature at the compressor drive turbine 20 discharge is 1334° R which is far below the respective temperatures for Engines A and B.

An analysis of the ideal versus the actual expansion of the hot gas 37 in the power output turbine 40 of Engine C shows that the ideal follows the adiabatic isentropic expansion with a differential of −0.0001, while the actual does not. The actual differential of 0.0903 is still slightly better than the same differentials for Engines A and B without superheat. In the cases of the actual expansion for Engine C without any superheat, the differential of 0.0903 shows that there is not enough heat in the hot gas 37 upstream of the power output turbine 40 to obtain proper adiabatic isentropic expansion.

In order to make Engine C comparable to Engine B, 1041° F. of superheat is added upstream of the power output turbine 40 to bring the hot gas temperature to 2375° R which is equal to the upstream temperature for Engine B with 350° F. superheat. The adiabatic isentropic expansion differential of 0.0818 shows that the temperature/pressure are still not in balance and that Engine C is still short of enough heat due to an increase in the exhaust gas temperature brought about because of the lower inlet pressure available at the power turbine inlet.

This demonstrates one of the features of this invention which is that the compressor 15 and compressor drive turbine 20 must be run at the highest possible discharge pressure and at the highest possible combustor 25 outlet temperature to achieve optimum engine performance with or without superheat. Reducing the heat in the primary combustor 25 as taught in the prior art and making up the heat in a reheat combustor will not improve overall engine 10 performance or efficiency.

One of the major features and advantages of this invention is that the energy added to the engine 12 by the superheat is mostly turned into useful work. The heat added to the hot gas 30 stream at the exhaust of the compressor drive turbine increases the enthalpy of the hot gas stream and brings the available heat for expansion in line with the available pressure. This will enable the power output turbine 40 to achieve a full adiabatic isentropic expansion with the highest possible power output and heat efficiency.

The added superheat does not noticeably increase the mass of the hot gas 37 flowing to the power output turbine 40. In the case of Engines A and B at a 350° F. superheat temperature, the percent of increase in engine hot gas 37 mass is 0.47 percent for each of the engines 12. This effectively means that the only loss to the engine 12 due to the addition of the superheat is from the inefficiency in the mechanical design of the power output turbine 40.

Figure 2:
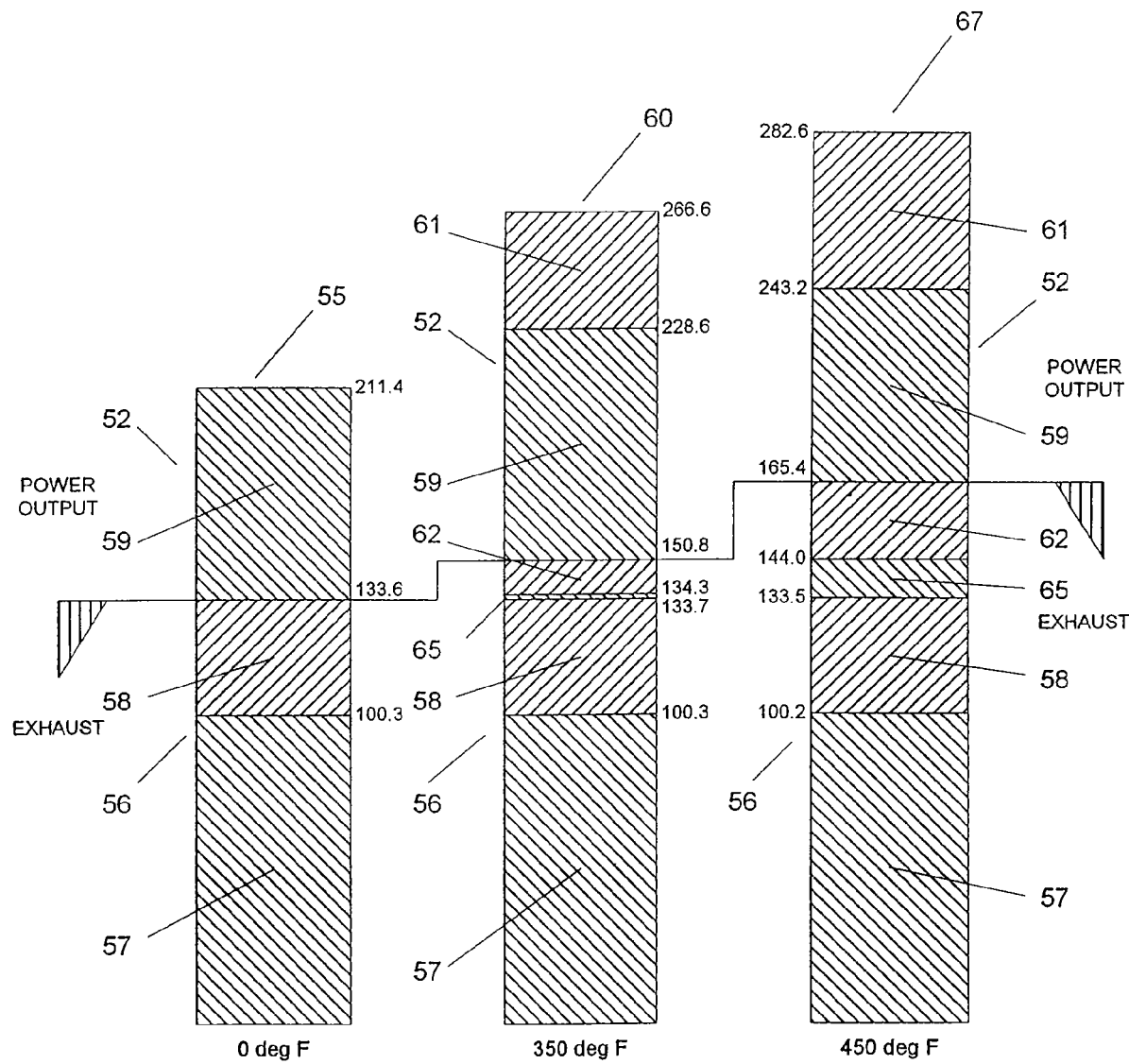
FIG. 2 is a bar graph showing the heat distribution between the power output and the exhaust of a gas turbine, Engine A, without superheat and with superheat of 350° F. and 450° F.

FIG. 2 shows the allocation of the heat in Engine A between the power output and the engine exhaust for three conditions if the power output turbine 40 for Engine A has an efficiency of 70 percent. The first bar graph shows the baseline engine 10 without superheat. The total heat input is 211.4 million BTUH with a total exhaust stream 56 of 133.6 million BTUH. The work 59 performed by this turbine is 77.8 million BTUH. The exhaust stream 56 consists of the actual exhaust 57 if the compressor drive turbine 40 was 100 percent efficient which is 100.3 million BTUH and the contribution to the exhaust 58 due to the inefficiency of the power output turbine 40 of 33.3 million BTUH.

The second bar graph shows Engine A with 350° F. of superheat added. Now the total heat input to the engine increases by 55.2 million BTUH to a total of 266.6 million BTUH. The 55.2 million BTUH is divided into 38 million BTUH which adds to the power turbine 40 output 61 for a total of 115.8 million BTUH, while 16.5 million BTUH is added to the exhaust 62 due to the inefficiency of the power output turbine 40. The exhaust stream 56 still contains the 133.7 million BTUH that is shown on the engine 10 without any superheat, so the total exhaust 56 heat content is 150.2 million BTUH which is 0.6 million BTUH short of the 150.8 million BTUH shown. This 0.6 million BTUH additional exhaust heat 65 is due to a 10° F. temperature difference between the actual exhaust temperature of the hot gas stream at the discharge of the power output turbine 40 for the engine 10 without superheat and the higher ideal exhaust gas 42 temperature of the power output turbine 40 of the superheated engine 12. If this differential exists then there is a slight excess of superheat temperature which is adding to the exhaust heat loss.

The third bar graph shows Engine A with 450° F. of superheat added. The total heat input added to the engine increases by 71.2 million BTUH to a total of 282.6 million BTUH. The 71.2 million BTUH is divided into 39.4 million BTUH which adds to the power turbine 40 output 61 for a total of 117.2 million BTUH while 21.4 million BTUH is added to the exhaust 62 due to the inefficiency of the power output turbine 40. The exhaust stream 56 still contains the 133.5 million BTUH that is shown on the engine 10 without any superheat;

so the total exhaust heat content is 154.9 million BTUH which is 10.5 million BTUH short of the 165.4 million BTUH shown. In this case the 10.5 million BTUH additional exhaust 65 heat is due to a 72° F. temperature difference between the actual exhaust temperature of the hot gas 42 stream at the discharge of the power output turbine 40 for the engine 10 without superheat and the higher ideal exhaust gas temperature of the power output turbine 40 of the superheated engine 12. As more and more superheat is added, the temperature differential will continue to increase and reduce the advantage gained by the increase in superheat temperature.

In the case of Engine A, the power without superheat is 77.8 million BTUH, the power with 350° F. superheat is 115.8 million BTUH, and the power with 450° F. superheat is 117.2 million BTUH. At the same time the exhaust for Engine A is 133.6 million BTUH with no superheat, 150.8 million BTUH with 350° F. of superheat, and 165.4 million BTUH with 450° F. superheat. This demonstrates that there is a specific level of superheat which can be used to achieve the ideal balance between temperature differential and pressure differential across the power output turbine which will give the proper adiabatic isentropic expansion in the turbine and the optimum engine performance.

Figure 3:
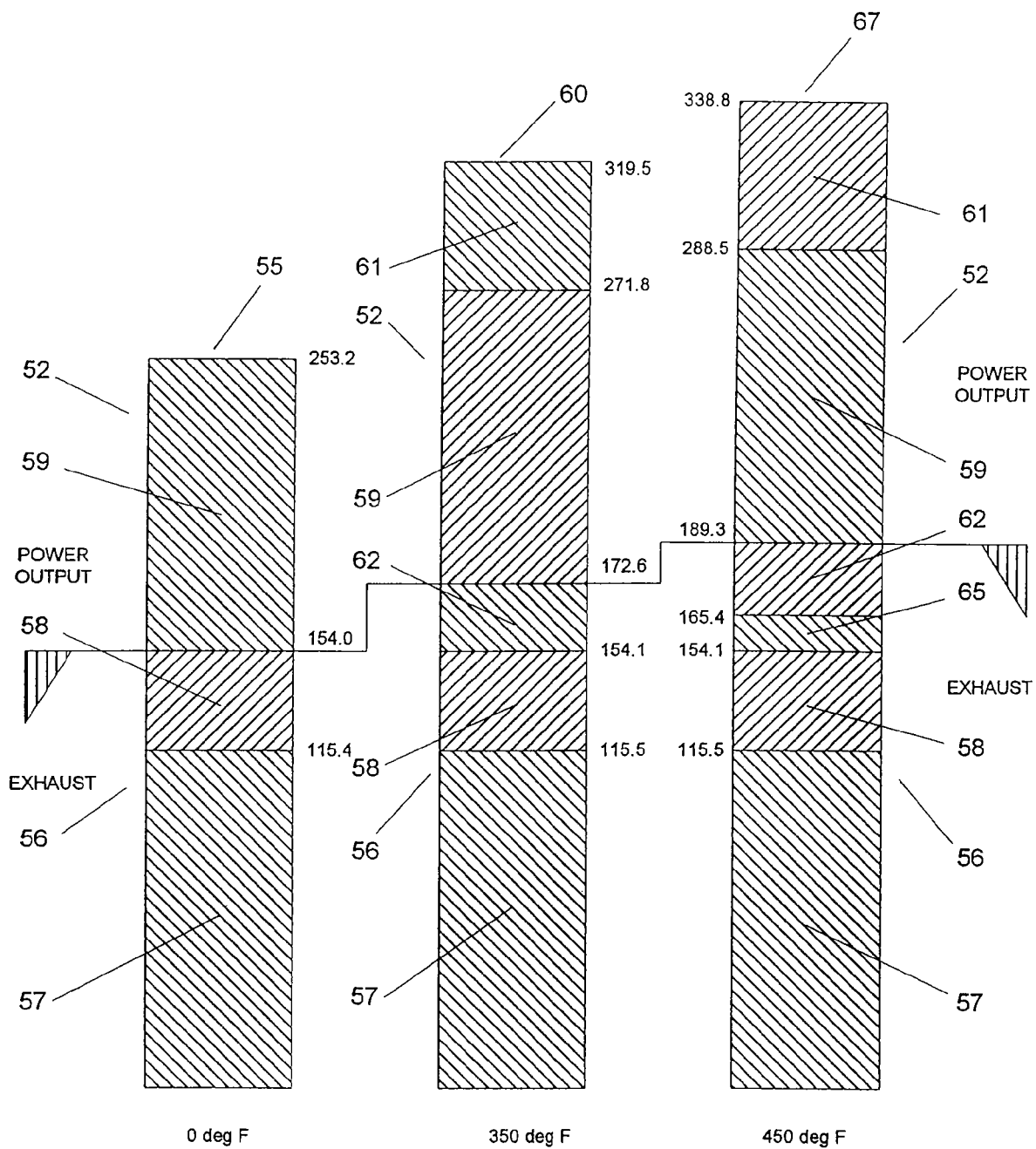
FIG. 3 is a bar graph showing the heat distribution between the power output and the exhaust of a gas turbine, Engine B, without superheat and with superheat of 350° F. and 450° F.

FIG. 3 shows the same bar graphs for Engine B. In the case of Engine B, the bar graph for the 350° F. superheat does not show that there is a temperature difference between the actual exhaust temperature of the hot gas 42 stream at the discharge of the power output turbine 40 for the engine 10 without superheat and the higher ideal exhaust gas temperature of the power output turbine 40 of the superheated engine 12. This shows that for Engine B the ideal superheat temperature is a few degrees above 350° F. while the ideal superheat temperature for Engine A is slightly under 350° F.

FIGS. 2 and 3 also show that under ideal conditions where the correct level of superheat temperature is added, the power gained from the superheat is very efficient. In the case of Engine A, the efficiency at 350° F. of superheat of the additional heat energy is 68.9 percent. In the case of Engine B, the efficiency at 350° F. of superheat of the additional heat energy is 72 percent. The high efficiency of the incremental power gain from the addition of superheat can be shown in FIGS. 2 and 3 because for Engine A a superheat addition of 55.2 million BTUH (350° F.) results in a net power increase of 38 million BTUH and an addition of 17.2 million BTUH to the exhaust flow. In the case of Engine B, a superheat addition of 66.3 million BTUH (350° F.) results in a net power increase of 47.7 million BTUH and an addition of 18.6 million BTUH to the exhaust flow. We can also see the same relationship measured in temperature differential as shown in Table 1. Under the power output turbine 40 expansion the exhaust temperature differential for Engine A with a 350° F. superheat of heat input is 113° F., leaving 237° F. of heat available to add to the useful work of the engine (Column T3 Engine A Line D-Engine A Actual). Engine B is even more efficient because the exhaust temperature differential for Engine B with a 350° F. superheat of heat input is 102° F. leaving 248° F. of heat available to add to the useful work (Column T3 Engine B Line D-Engine B Actual). The difference in heat added to the exhaust between Engine A and Engine B is due to the respective power turbine 40 efficiencies and this in turn is due to different hot gas 18 pressures available at the discharge of the compressor drive turbine.

In both Engine A and Engine B, the mass of the hot process gas 37 passing through the turbines stays the same with or without superheat. There is only a small difference in mass due to the fuel added to achieve the superheat temperature which in both engines 12 is less than 0.5 percent. This analysis is based on the assumption that the power turbine 40 mechanical efficiency remains the same during the addition of superheat and the compressor drive turbine 20 temperature and pressure remain constant as shown in Table 1.

Using Engine B as an example, a further analysis can be performed to demonstrate how the incremental addition of superheat is considerably more efficient than the base Engine B or a version of Engine B designated B(1) with the same power output as Engine B with 350° F. superheat designated B(2). Table 2 shows the characteristics of Engines B, B(1) and B(2). Engine B(1) is the same as Engine B in that it has the same compression ratio (23.1 to 1), the same efficiency, the same heat rate, and the same power turbine 40 temperature differential. Engine B(1) is provided with power output capacity equal to Engine B(2) which can only be accomplished by increasing the exhaust 42 flow from 182.7 lbs. per second for Engine B up to 270.5 lbs. per second for Engine B(1). At the same time the total heat input increases from 253.2 million BTUH for Engine B up to 374.9 million BTUH for Engine B(1) to give it the same power output as Engine B(2) which has a total heat input of 319.5 million BTUH. This means that increasing the capacity of Engine B to Engine B(1) requires the addition of 121.7 million BTUH, of which 74 million BTUH is added to the Engine B(1) exhaust. This compares to Engine B(2) where the total superheat added is 66.3 million BTUH and the heat added to the exhaust is 18.5 million BTUH.

Figure 4:
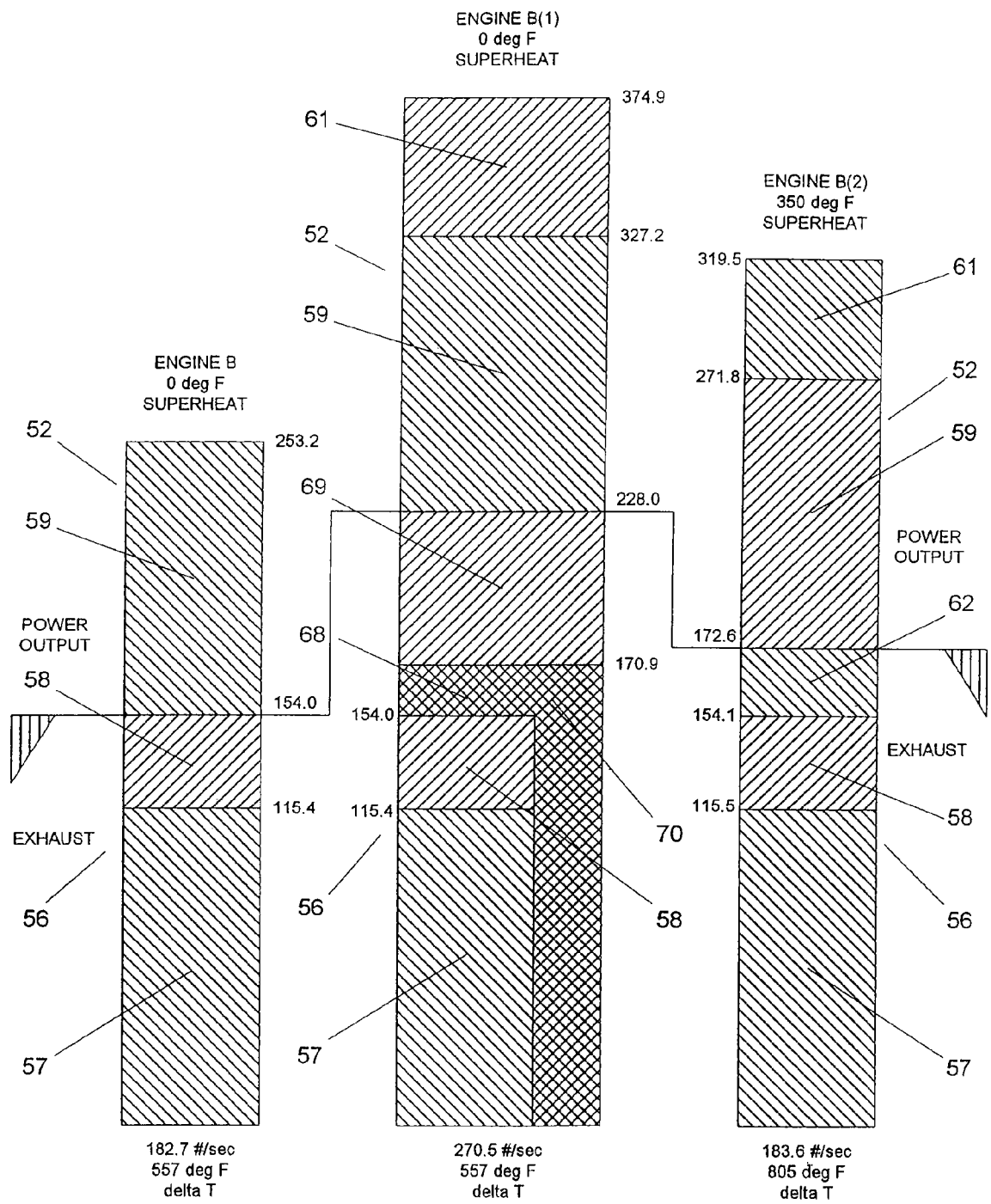
FIG. 4 is a bar graph showing the power output, exhaust flow, and mass flows for Engines B, B(1) and B(2).

FIG. 4 shows a bar graph presentation of Engines B, B(1) and B(2). The width of the bars represents the volume of the hot gas 42 flowing through each engine 10 per second. A section line represents the boundary between the power output 52 of each engine and the exhaust 56. The total height of each bar indicates the total heat input required for the respective engine to achieve design performance. Subtracting the total power output 52 from the total heat input gives the heat lost in the exhaust 56 for each engine.

TABLE 2

|  | Engine B | Engine B(1) | Engine B(2) 350° F. Superheat |
|---|---|---|---|
| A) Superheat Temperature deg F. | 0 | 0 | 350 |
| B) Output (KWH) | 29,080 | 43,058 | 43,058 |
| C) Output (HP/HR) | 38,995 | 57,739 | 57,739 |
| D) Heat Input (BTUH) | 253,215,623 | 374,961,695 | 319,454,091 |
| E) Heat Rate (BTU/KWH, LHV) | 8708 | 8708 | 7419 |
| F) Comp Ratio (Total) | 23.1 | 23.1 | 23.1 |
| G) Comp Ratio (LPT) | 6.87 | 6.87 | 6.87 |
| H) Power Turbine delta T deg F. | 557 | 557 | 805 |
| I) Exhaust Flow (#/sec) | 182.7 | 270.5 | 183.55 |

TABLE 2-continued

|  | Engine B | Engine B(1) | Engine B(2) 350° F. Superheat |
|---|---|---|---|
| J) Exhaust Temp deg R | 1468 | 1468 | 1570 |
| K) Total Efficiency | 39.18 | 39.18 | 45.99 |
| L) Superheat Efficiency | 0 | 0 | 72 |
| M) Specific Work (KWH/#air) | 0.0442 | 0.0442 | 0.0652 |
| N) Specific Fuel Consumption (Nat Gas) | 0.308 | 0.308 | 0.262 |
| O) Specific Fuel Consumption (#2 Oil) | 0.347 | 0.347 | 0.296 |
| P) Reduction $CO_2$ Formation % | 0.00 | 0.00 | 17.37 |

The bar graph for engine B(1) has the exhaust 56 from Engine B superimposed on the graph in order to illustrate the additional exhaust 56 heat losses that develop when the capacity of Engine B is increased to the capacity of Engine B(1). In this case the exhaust 56 of Engine B is 154.0 million BTUH, of which 115.4 million BTUH is the theoretical exhaust 57 component and the 38.6 million BTUH (155.4-115.4) portion of the exhaust 58 is due to the inefficiency of the power output turbine 40. The total hot gas flow for Engine B is 182.7 lbs. per second and differential temperature across the power output turbine 40 is 557° F. The exhaust of Engine B(1) is 228.0 million BTUH which is 74 million BTUH greater than Engine B. Also the total exhaust 56 of Engine B(1) is divided into the theoretical exhaust 68 of 170.9 million BTUH and additional exhaust 69 of 57.1 million BTUH due to the power output turbine 40 inefficiency. In addition Engine B(1) hot gas 42 flow is 270.5 lbs. per second. This means that 87.8 lbs. per second (270.5-182.7) of additional hot gas is being vented to the atmosphere which has been heated to a temperature of 1468° R. This additional heat loss is one reason why Engine B(1) is not as efficient as the engine 12 with superheat.

The bar graph for Engine B(2) shows that the total heat input for Engine B(2) is 319.5 million BTUH with a total exhaust 56 heat loss of 172.6 million BTUH and a temperature differential of 805° F. across the power output turbine 40. Engine B(2) has a hot gas 42 flow rate of 183.6 lbs. per second which is less than 0.5 percent more than the hot gas 42 flow for Engine B and due to the weight of the fuel necessary to provide the 350° F. of superheat. The exhaust heat 56 of Engine B(2) is made up of 154.1 million BTUH which is equal to the exhaust heat 56 from Engine B plus 18.5 million BTUH (172.6-154.1) of additional exhaust heat 62 due to the addition of 66.2 million BTUH of heat required to gain 350° F. of superheat. This additional exhaust heat is 28 percent of the superheat added. The remaining superheat, 72 percent of the total superheat added, contributes to the work of the power output turbine 40. Since the hot gas flow rate stays at 183.6 lbs. per second, the 18.5 million BTUH of additional exhaust heat 62 causes the exhaust temperature to increase by 102° F. from 1468° R for Engine B to 1570° R for Engine B(2).

The trends in engine performance that can be achieved by adding superheat are documented in Table 3. This table shows Engines A and B without superheat and the effect of adding superheat in 50° F. increments starting at 200° F. and increasing to 450° F. For both Engines A and B, the best overall engine performance is achieved with the addition of 350° F. superheat to each of the engines 12.

At 350° F. superheat, both engines 12 achieve the lowest heat rate which is calculated by dividing the total heat input in BTU per hour (Line D) by the kilowatt hours of power produced (Line B) using the fuel lower heating value. Engine A has a heat rate of 9273 BTU/KWH with no superheat and a heat rate of 7854 BTU/KWH with 350° F. of superheat added. Engine B is more efficient than Engine A and has a heat rate of 8708 BTU/KWH with no superheat and a heat rate of 7419 BTU/KWH with 350° F. of superheat added.

Table 3 also shows in line H that both Engines A and B have an almost constant rate of exhaust flow over the range from no superheat up to 450° F. superheat. The only difference in the exhaust flow rate is due to the addition of the fuel required to achieve the required superheat temperature. At the optimum condition of 350° F. superheat, the fuel added is less than 0.5 percent of the total exhaust mass flow, which means that the incremental addition of superheat energy is mostly turned into output power and not lost in the exhaust flow.

One direct advantage of adding superheat to a gas turbine is in efficiency improvement. Engine A has a 36.79 percent efficiency without superheat. When superheat is added, the efficiency increases until the optimum superheat temperature of 350° F. is achieved. At this point, the efficiency of 43.44 percent is shown to be the highest. Beyond 350° F. the efficiency begins to drop. This is due to the efficiency of the additional superheat energy which is shown in the next line. At 350° F., the superheat component efficiency starts to drop which in turn reduces the overall engine efficiency as more superheat is added. Engine B has an efficiency of 39.18 percent without superheat and an efficiency of 45.99 percent with 350° F. superheat added. In the case of Engine B, the superheat component efficiency stays above 72 percent until the superheat temperature exceeds 350° F.

On some high capacity gas turbines 10, the power output shaft 22 has a low pressure compressor 23 which is used to augment the work done by the main (or high pressure) compressor 15. This low pressure compressor 23 uses some of the power output from the output turbine 40 to pump the low pressure compressed air. If superheat is applied to this type of gas turbine 12, then the power output gain obtained from the addition of superheat must be reduced by the additional work absorbed in the low pressure compressor 23 as well as the efficiency loss of the power output turbine 40.

TABLE 3

COMPARISON TABLE
ENGINES A AND B

Engine A

| | | | | |
|---|---:|---:|---:|---:|
| A) Superheat Temperature deg F. | 0 | 200 | 250 | 300 |
| B) Output (KWH) | 22,800 | 29,217 | 30,844 | 32,473 |
| C) Output (HP/HR) | 30,574 | 39,179 | 41,360 | 43,546 |
| D) Heat Input (BTUH) | 211,427,136 | 242,707,363 | 250,634,934 | 258,578,721 |
| E) Heat Rate (BTU/KWH, LHV) | 9273 | 8307 | 8125 | 7962 |
| F) Comp Ratio (Total) | 18.8 | 18.8 | 18.8 | 18.8 |
| G) Comp Ratio (LPT) | 6.2 | 6.2 | 6.2 | 6.2 |
| H) Exhaust Flow (#/sec) | 152 | 152.4 | 152.51 | 152.61 |
| I) Exhaust Temp deg R | 1506 | 1568 | 1584 | 1600 |
| J) Total Efficiency | 36.79 | 41.07 | 41.99 | 42.85 |
| K) Superheat Efficiency | 0 | 70 | 70 | 70 |
| L) Specific Work (KWH/#air) | 0.0417 | 0.0533 | 0.0562 | 0.0591 |
| M) Specific Fuel Consumption (Nat Gas) | 0.328 | 0.293 | 0.287 | 0.281 |
| N) Specific Fuel Consumption (#2 Oil) | 0.370 | 0.331 | 0.324 | 0.318 |
| O) Reduction $CO_2$ Formation % | 0.00 | 11.62 | 14.13 | 16.46 |

Engine B

| | | | | |
|---|---:|---:|---:|---:|
| A) Superheat Temperature deg F. | 0 | 200 | 250 | 300 |
| B) Output (KWH) | 29,080 | 37,015 | 39,020 | 41,033 |
| C) Output (HP/HR) | 38,995 | 49,636 | 52,325 | 55,025 |
| D) Heat Input (BTUH) | 253,215,623 | 290,819,254 | 300,321,172 | 309,861,696 |
| E) Heat Rate (BTU/KWH, LHV) | 8708 | 7857 | 7697 | 7552 |
| F) Comp Ratio (Total) | 23.1 | 23.1 | 23.1 | 23.1 |
| G) Comp Ratio (LPT) | 6.87 | 6.87 | 6.87 | 6.87 |
| H) Exhaust Flow (#/sec) | 182.7 | 183.19 | 183.31 | 183.43 |
| I) Exhaust Temp deg R | 1468 | 1526 | 1541 | 1555 |
| J) Total Efficiency | 39.18 | 43.43 | 44.33 | 45.18 |
| K) Superheat Efficiency | 0 | 72 | 72 | 72 |
| L) Specific Work (KWH/#air) | 0.0442 | 0.0561 | 0.0591 | 0.0621 |
| M) Specific Fuel Consumption (Nat Gas) | 0.308 | 0.278 | 0.271 | 0.267 |
| N) Specific Fuel Consumption (#2 Oil) | 0.347 | 0.313 | 0.306 | 0.301 |
| O) Reduction $CO_2$ Formation % | 0.00 | 10.83 | 13.14 | 15.31 |

Engine A

| | | | |
|---|---:|---:|---:|
| A) Superheat Temperature deg F. | 350 | 400 | 450 |
| B) Output (KWH) | 33,941 | 34,139 | 34,339 |
| C) Output (HP/HR) | 45,514 | 45,779 | 46,047 |
| D) Heat Input (BTUH) | 266,560,192 | 274,568,397 | 282,608,874 |
| E) Heat Rate (BTU/KWH, LHV) | 7854 | 8043 | 8230 |
| F) Comp Ratio (Total) | 18.8 | 18.8 | 18.8 |
| G) Comp Ratio (LPT) | 6.2 | 6.2 | 6.2 |
| H) Exhaust Flow (#/sec) | 152.71 | 152.81 | 152.91 |
| I) Exhaust Temp deg R | 1619 | 1668 | 1717 |
| J) Total Efficiency | 43.44 | 42.42 | 41.46 |
| K) Superheat Efficiency | 68.95 | 61.27 | 55.30 |
| L) Specific Work (KWH/#air) | 0.0617 | 0.0621 | 0.0624 |
| M) Specific Fuel Consumption (Nat Gas) | 0.277 | 0.284 | 0.291 |
| N) Specific Fuel Consumption (#2 Oil) | 0.313 | 0.321 | 0.328 |
| O) Reduction $CO_2$ Formation % | 18.07 | 15.30 | 12.67 |

Engine B

| | | | |
|---|---:|---:|---:|
| A) Superheat Temperature deg F. | 350 | 400 | 450 |
| B) Output (KWH) | 43,058 | 43,466 | 43,822 |
| C) Output (HP/HR) | 57,739 | 58,286 | 58,764 |
| D) Heat Input (BTUH) | 319,454,091 | 329,089,905 | 338,760,310 |
| E) Heat Rate (BTU/KWH, LHV) | 7419 | 7571 | 7730 |
| F) Comp Ratio (Total) | 23.1 | 23.1 | 23.1 |
| G) Comp Ratio (LPT) | 6.87 | 6.87 | 6.87 |
| H) Exhaust Flow (#/sec) | 183.55 | 183.68 | 183.8 |
| I) Exhaust Temp deg R | 1570 | 1618 | 1663 |
| J) Total Efficiency | 45.99 | 45.07 | 44.14 |
| K) Superheat Efficiency | 72 | 64.69 | 58.80 |
| L) Specific Work (KWH/#air) | 0.0652 | 0.0657 | 0.0662 |
| M) Specific Fuel Consumption (Nat Gas) | 0.262 | 0.267 | 0.273 |
| N) Specific Fuel Consumption (#2 Oil) | 0.296 | 0.302 | 0.308 |
| O) Reduction $CO_2$ Formation % | 17.37 | 15.01 | 12.64 |

In addition, some gas turbines with a low pressure compressor 23 connected in series to a high pressure compressor 15 inject atomized water 32 into the hot gas 24 as it leaves the low pressure compressor 23, so it will evaporate and cool the low pressure compressed air 24 before it enters the high pressure compressor 15. This method of cooling the compressed air 24 can be used on superheated gas turbines 12 to improve the overall gas turbine efficiency and power output.

One of the measures of gas turbine output is the measure of specific work. Specific work is calculated by dividing the kilowatt hours of power produced by the gas turbine by the pounds of air and combustion products passing through the engine. In the case of Engines A and B without superheat, the specific work is 0.0417 and 0.0442 respectively. As superheat energy is added to both of these engines, the specific work increases because the output from the power output turbine 40 is increased while the mass flow through the turbine 12 stays almost constant. Specific work is a measure of the ability of the engine to extract useful work out of a pound of air. Without superheat, a specific work number above 0.0450 would be very difficult to achieve.

Another measure of the performance of an engine 12 is the specific fuel consumption. Specific fuel consumption is calculated by dividing the fuel consumed in pounds per hour by the horsepower output of the engine 12. In the case of Engines A and B without superheat, the specific fuel consumption for A comparison of the performance capabilities of Engines A, B and C shows that excessive superheat does not provide a corresponding gain in engine performance. Table 4 shows the performance capability of Engine A with no superheat and with 350° F. superheat in the first two columns. The next two columns show Engine B with no superheat and with 350° F. superheat. The last two columns show Engine C without superheat and with 1041° F. of superheat in order to raise the compressor drive turbine outlet temperature to the same level as Engine B. Because Engine C was designed to use the minimum heat required to drive the compressor 15, so it can provide 181.12 lbs. per second of air at a compression ratio of 23.1:1, the compressor drive turbine 20 outlet pressure is 60.36 PSIG which is about two-thirds of the pressure available at the same point from Engine B. At the same time, the compressor drive turbine 20 exhaust temperature for Engine C is also much lower. This means that the power output from Engine C without superheat is 14,768 KW which is a little over half of the power output of Engine B without superheat.

TABLE 4

COMPARISON OF ENGINES A, B AND C

|  | Engine A | | Engine B | | Engine C | |
| --- | --- | --- | --- | --- | --- | --- |
| A) Superheat Temperature deg F. | 0 | 350 | 0 | 350 | 0 | 1041 |
| B) Output (KWH) | 22,800 | 33,941 | 29,080 | 43,058 | 14,768 | 27,146 |
| C) Output (HP/HR) | 30,574 | 45,514 | 38,995 | 57,739 | 19,804 | 36,402 |
| D) Heat Input (BTUH) | 211,427,136 | 266,560,192 | 253,215,623 | 319,454,091 | 129,800,010 | 319,506,304 |
| E) Heat Rate (BTU/KWH, LHV) | 9273 | 7854 | 8708 | 7419 | 8789 | 11770 |
| F) Comp Ratio (Total) | 18.8 | 18.8 | 23.1 | 23.1 | 23.1 | 23.1 |
| G) Comp Ratio (LPT) | 6.2 | 6.2 | 6.87 | 6.87 | 4.11 | 4.11 |
| H) Exhaust Flow (#/sec) | 152 | 152.71 | 182.7 | 183.55 | 181.12 | 183.58 |
| I) Exhaust Temp deg R | 1506 | 1619 | 1468 | 1570 | 1030 | 1874 |
| J) Total Efficiency | 36.79 | 43.44 | 39.18 | 45.99 | 38.82 | 28.99 |
| K) Superheat Efficiency | 0 | 68.95 | 0 | 72 | 0 | 22.26 |
| L) Specific Work (KWH/#air) | 0.0417 | 0.0617 | 0.0442 | 0.0652 | 0.0226 | 0.0411 |
| M) Specific Fuel Consumption (Nat Gas) | 0.328 | 0.277 | 0.308 | 0.262 | 0.310 | 0.416 |
| N) Specific Fuel Consumption (#2 Oil) | 0.370 | 0.313 | 0.347 | 0.296 | 0.350 | 0.469 |
| O) Reduction $CO_2$ Formation % | 0.00 | 18.07 | 0.00 | 17.37 | 0.00 | −26.10 | natural gas is 0.328 and 0.308 respectively, and for number 2 fuel oil 0.370 and 0.347 respectively. These are based on the lower heating value of the fuels and compare very favorably with a specific fuel consumption of 0.35 for a very efficient diesel engine. The best specific fuel consumption with superheat is achieved at 350° F. for both Engines A and B. The specific fuel consumption for Engine A with 350° F. superheat on natural gas is 0.277 and on number 2 fuel oil is 0.313. The specific fuel consumption for Engine B with 350° F. superheat on natural gas is 0.262 and on number 2 fuel oil is 0.296. These are exceptionally low specific fuel consumption figures which show that the superheated gas turbine 12 is very efficient.

Another benefit achieved by this invention and the high efficiency of the superheated gas turbine is in the reduction of $CO_2$ formed in the process of burning fuel in the engine. Line O of Table 3 shows that Engine A and Engine B without superheat are the baseline for $CO_2$ formation. The addition of superheat will increase the overall engine efficiency and reduce the formation of $CO_2$ as a percentage of the baseline engine at the same capacity. At the ideal superheat temperature of 350° F., Engine A will produce 18.07 percent less $CO_2$ while Engine B will produce 17.37 percent less $CO_2$ than a baseline gas turbine 10 of the same capacity.

In order to make the performance of Engine C comparable to Engine B, 1041° F. of superheat was added to the compressor drive turbine 20 exhaust to bring it up to the same temperature as the superheat temperature for Engine B. The table shows that with the superheat added Engine C has a power output of 27,146 KW which is less than the power output of Engine B without superheat. This demonstrates that just adding heat to the compressor drive turbine 20 exhaust does not necessarily improve engine 12 performance. Engine 12 performance can only be maximized by adjusting the superheat temperature to bring the expansion of the hot gas 37 through the power output turbine 40 as close to the ideal adiabatic isentropic expansion as possible.

The superheated gas turbine 12 has a stepped combustion process. The air 18 discharging from the compressor 15 is heated by the fuel 26 burned in the primary combustion chamber 25. The hot gas 28 is then expanded in the compressor drive turbine 20 where some of the heat is recovered as work to drive the compressor 15. After the hot gas 30 leaves the compressor drive turbine 20, the appropriate superheat is added by burning additional fuel 36 in the superheat combustion chamber 35. The superheated gas 37 is then expanded in the power output turbine 40 where the temperature is again reduced prior to the hot gas 42 being vented to the exhaust.

The stepped combustion process is a way of introducing the maximum amount of total energy to the hot air stream without developing overheated components within the engine 12. Stepped combustion is also different than the concept of staged combustion because all the combustion process in stepped combustion is performed in an air rich environment. In contrast the first part of staged combustion is performed in a fuel rich environment while the second stage of staged combustion is performed in an air rich environment. Also staged combustion is usually done in separate zones of the same combustion chamber while stepped combustion is performed in two separate combustion chambers. Both stepped combustion and staged combustion will reduce $NO_x$ formation through the process of extracting energy from the combustion process between the first and second combustion phases. In the superheated gas turbine 12, the stepped combustion process will not only reduce $NO_x$ through the heat extraction between stages but will in addition reduce $NO_x$ formation by completing superheat combustion in an environment containing a higher percentage of inert gases which will inhibit $NO_x$ formation.

The stepped combustion process must be performed within the flammability limits in each combustion chamber. For Engines A and B, the primary combustion will reduce the oxygen content of the air from 20.9 percent by volume to 14.9 percent by volume. Using the ideal superheat temperature rise of 350° F. for both engines, the superheat burn will reduce the oxygen content of the hot gas from 14.9 percent to 13.3 percent in the exhaust. The superheat combustor 35 in the case of both engines will have an inlet temperature at full power of between 1560° F. and 1570° F. so the superheat combustor 35 will be well within the flammability limits of the air fuel mixture. At lessor power settings, the inlet temperature will drop; however, the oxygen content at the same time will go up which will maintain the flammability limits. In the case of Engines A and B, the superheat is less than 25 percent of the total heat input to the engines. The primary combustor 25 heat input is 75 percent of the total heat load of the engines. Unless special circumstances require it, it is unlikely that more than 25 percent of the total heat will be required to bring the power turbine into adiabatic isentropic balance.

The superheat combustor 35 has different design characteristics than the primary combustion chamber 25. The primary combustion chamber 25 has a much higher heat release rate per cubic foot of combustor volume. The primary combustion chamber 25 has higher pressure losses which come from diffusion losses that develop while slowing down the flow from the compressor discharge, the friction losses within the combustor, and the momentum losses due to the acceleration of the hot gas 28 at the entrance of the first turbine nozzle. These losses can amount to 3 to 8 percent of the compressor outlet pressure.

The superheat combustor 35 has a low pressure drop because it does not have the losses associated with diffusion from the compressor or the momentum change in the gas velocity. The superheat combustor 35 is designed with a flow obstruction which develops a localized bluff body (not shown) in the hot gas 30 flow where the fuel can be injected and ignited. The bluff body causes a turbulent mixing of the hot gas and fuel while maintaining a stationary flame front by balancing hot gas velocity and flame propagation rate within the superheat combustor 35. Because the temperature increase in the superheat combustor 35 is low (350° F.), a bluff body which consists of sections of a ring which is concentric to the shaft 22 of the power output turbine 40 and located midway between the inner and outer wall of an annular superheat combustor 35 would provide the best flame stability. The sections of the ring that make up the bluff body will allow for lateral propagation around the annular superheat combustor 35 and develop an even temperature distribution. The bluff body used to stabilize the superheat combustor 35 is a low pressure drop design. Unlike the primary combustion chamber 25 where the pressure drop can be from 5 to 20 PSIG, the pressure drop in the superheat combustor 35 can be in the range of 4 to 20 inches WC. The actual pressure drop selected should be the minimum required to stabilize the flame front and promote the necessary level of mixing at the discharge of the superheat combustor 35.

The superheat combustor 35 will have a lower heat release rate per cubic foot of volume than the primary combustor 25. Combustion heat release rate is directly proportional to the absolute pressure, so in the case of Engines A and B, the volume of the superheat combustor 35 will be 85 and 90 percent respectively of the volume of the primary combustor 25.

The superheat combustor 35 should have positive ignition control at all times. Even though the hot gas 30 and fuel 36 mixture in the superheat combustion chamber 35 could achieve auto-ignition, the superheated gas turbine 12 should have electric or other types of positive ignition control at all times. Also the superheat combustor 35 should not be ignited until the primary combustor 25 is ignited and the power output shaft 22 is turning.

The superheated gas turbine 12 can also be designed to use steam to augment the power output of the gas turbine 12. Unlike present gas turbines 10 where steam is injected into the primary combustion chamber 25 to increase the output power, the superheated gas turbine 12 would use steam injection into the superheat combustor 35 only to achieve the same objective. The superheated gas turbine 12 would not use steam injection in the primary combustor 25, because it would reduce the oxygen content available in the hot gas downstream of the compressor drive turbine 20. Also two-thirds of the additional power obtained from the steam injection in the primary combustor 25 would be consumed by the compressor drive turbine 20. Steam injected in the superheat combustor 35 would provide additional output power from the power output turbine 40 and the only loss would be due to inefficiency in the power output turbine 40 assembly. This also means that much less steam would be required to obtain the same power output. A single cycle gas turbine 10 with steam injection might use 0.2 to 1.2 pounds of steam per pound of fuel in the primary combustion chamber 25 to gain from 1 to 10 percent increase in output power. The superheated gas turbine 12 could obtain the same power increase using 0.05 to 0.4 pounds of steam per pound of fuel 36 in the superheat combustor 35 and would consume much less feed water than current designs. The present gas turbines 10 require steam to be injected at high pressures which could be as high as 400 PSIG or higher. The superheated gas turbine 12 could use low pressure steam which is less than 150 PSIG which is often more readily available.

Figure 5:
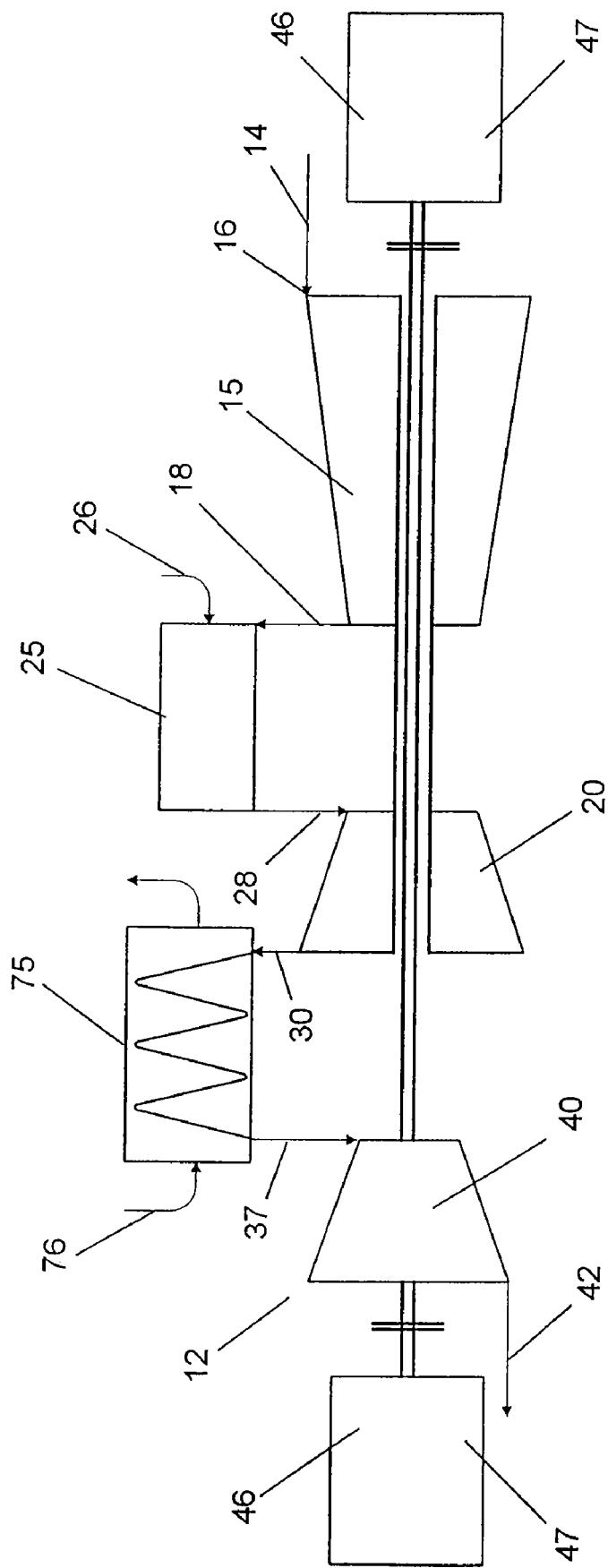
FIG. 5 is a schematic showing the elements of a dual shaft gas turbine with a conventional combustor and indirect superheat.

In FIG. 5 a superheated gas turbine 12 is shown which has a primary combustor 25 which burns liquid or gas fuels 26 to increase the hot air temperature before it enters the compressor drive turbine 20. After the hot gas 30 leaves the compressor drive turbine 20, it gains the required superheat from an indirect heat source, such as a waste heat stream in an industrial plant. The hot gas from the compressor drive turbine 20 which is at approximately 100 PSIA pressure is sent to a gas tight heat exchanger 75 where it picks up the required superheat from an indirect heat source 76. The waste heat source 76 can be at low pressure and must enter the heat exchanger at least 200 to 300° F. above the superheat temperature of the turbine 12.

Figure 6:
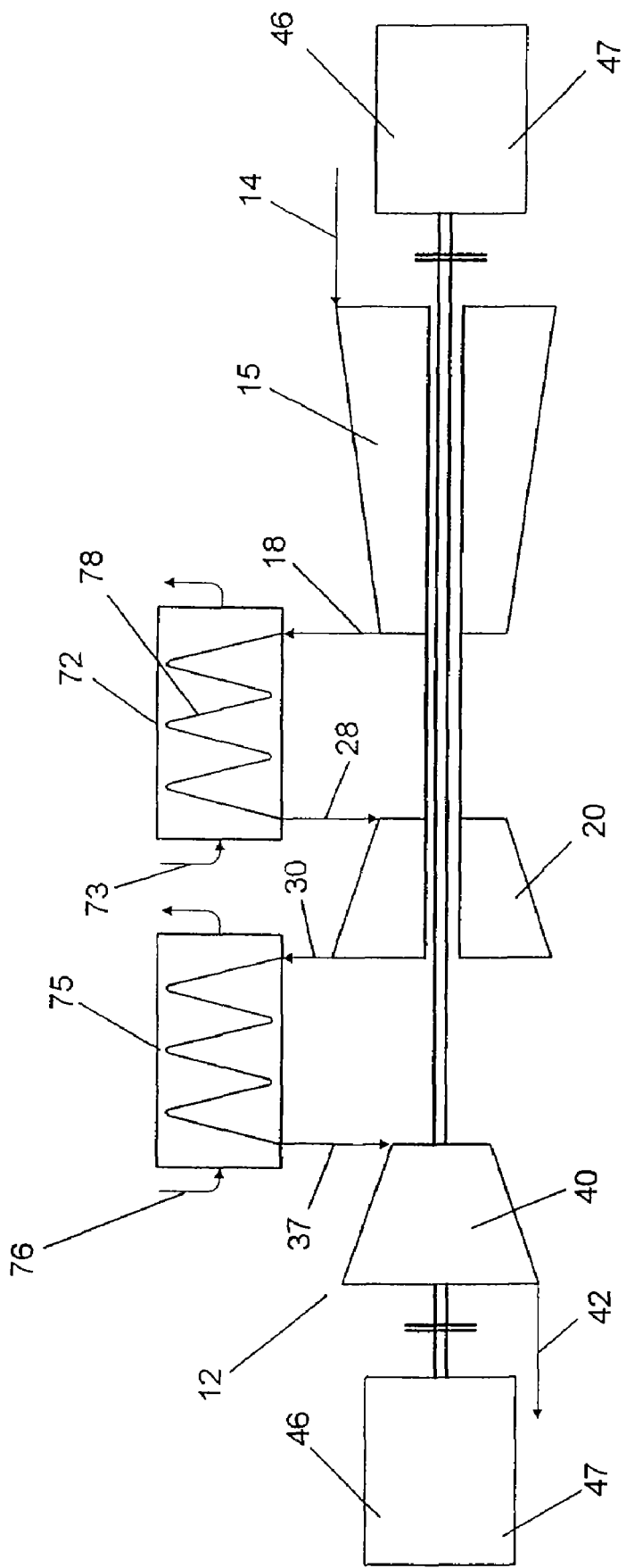
FIG. 6 is a schematic showing the elements of a dual shaft gas turbine with indirect primary heat and indirect superheat.

An alternative gas turbine design is shown in FIG. 6 where both the primary combustor 25 and superheat combustor 35 are replaced with indirect heating sources. In this case, the primary gas tight heat exchanger 72 will see the hot gas 18 from the compressor 15 discharge which in the case of Engines A and B can be at a pressure of up to 340 PSIA and will require an increase in temperature of approximately 1400° F. As with the superheat heat exchanger 75, the waste gas 73 can be at low pressure, can come from an industrial process, and must be 200 to 300° F. hotter than the required combustor 25 discharge temperature of the fuel 26 fired engine. For engines like A and B which have high outputs these heat exchangers 72 would be very large; however, it is desirable to reduce the volume of the hot gas 78 contained in the heat exchanger to improve the response time of the gas turbine 12 during changes in power settings.

Figure 7:
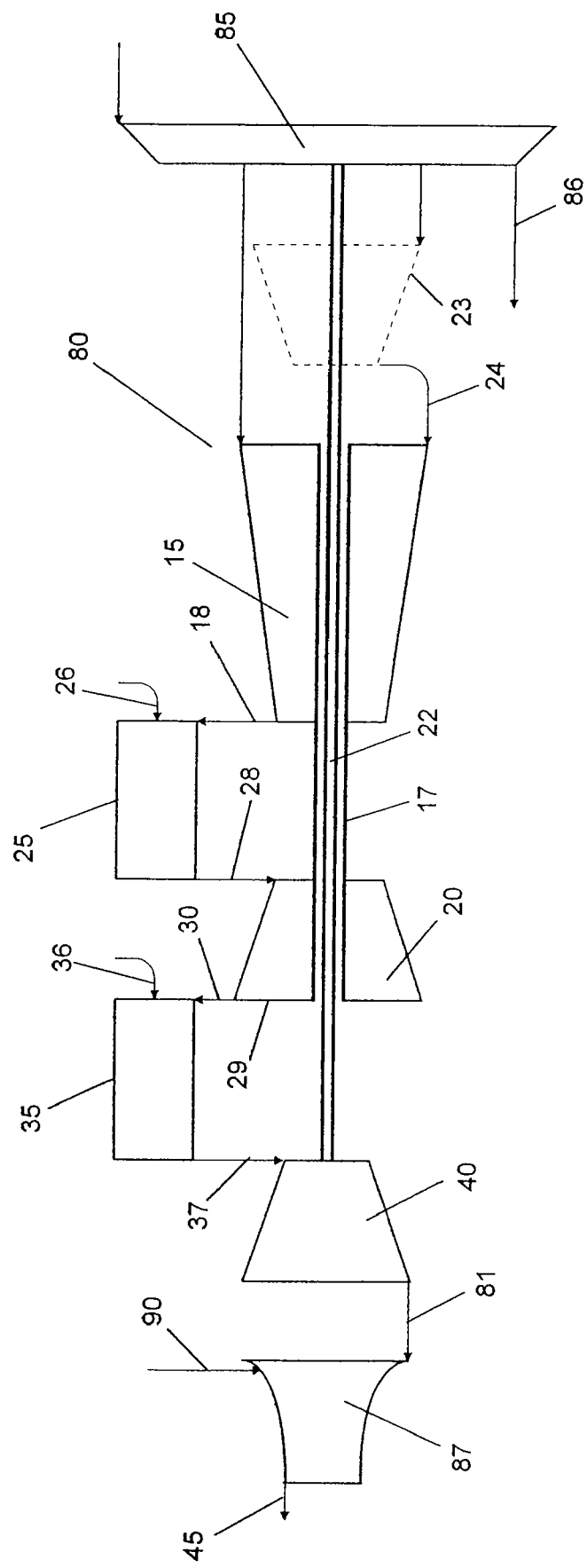
FIG. 7 is a schematic showing the elements of an aviation gas turbine with a high ratio bypass fan used in conjunction with superheat.

The superheated gas turbine can also be used in aviation applications. FIG. 7 shows a high bypass ratio jet engine 80 similar to units used on transport aircraft today. This engine 80 has a compressor 15 which discharges hot pressurized air 18 into a primary combustion chamber 25. Fuel 26 is added and burned to raise the hot gas 28 temperature before the hot gas 28 enters the compressor drive turbine 20. After the hot gas 30 is expanded in the compressor drive turbine 20, it enters the superheat combustor 35 where the temperature is increased until the adiabatic isentropic expansion can be achieved in the power output turbine 40. In the case of a high bypass ratio fan jet engine 80, the power output turbine 40 is designed to drive the bypass fan 85. The aviation engine has two additional features as a result of its unique operating environment. The first is the gain in static pressure at the inlet of the engine 80 due to the forward flight of the aircraft which increases the compressor outlet 18 pressure. All other parameters being equal, this in turn means that the discharge pressure of the compressor drive turbine 20 will be higher, so it will take slightly more superheat to bring the hot gas 30 to the proper temperature for the adiabatic isentropic expansion in the power output turbine 40.

The second feature is the thrust 45 component in the hot gas 81 from the power output turbine 40. The discharge nozzle 87 has an isentropic expansion which takes the remaining energy in the hot exhaust gas 81 and turns it into thrust 45. The thrust 45 from the nozzle 87 augments the thrust 86 component from the bypass fan 85 to provide the total thrust for the fan jet engine 80. The superheated aircraft engine 80 can also be fitted with an afterburner 90 which will further improve the engine performance. The afterburner 90 is not equal to the superheat combustor 35 because it is located downstream of the power output turbine 40 and uses the bypass air 86 to add oxygen to the afterburner combustion process.

In aircraft engines, the superheat feature will probably be used during take-off and high power low level flight.

The main feature of this invention, which is the application of superheat to the hot gas 30 stream from the discharge of the compressor drive turbine 20 in order to adjust the temperature of the hot gas 30, so that adiabatic isentropic expansion can take place in the power output turbine 40, can be applied to both older turbines 10 as a retro-fit package or incorporated into the design of new gas turbine engines 12. The retro-fit package can be applied to gas turbines 10 which have a sufficient space between the compressor drive turbine 20 and the power output turbine 40 to install the superheat combustor 35 assembly. Other older turbines 10 can have the superheat combustor 35 added as a retro-fit during overhauls where the power output turbine shaft 22 can be extended to make space for the superheat combustor 35. There are even cases where the modular core design concept used by some gas turbine manufacturers can make room between the modules of the engine to add the superheat combustor 35 with its gain in capability.

The advantages of greater power production and efficiency gained by applying superheat technology to new gas turbine designs should improve the performance of a wide variety of future gas turbine engines. The description of the preferred embodiment described herein is not intended to limit the scope of the invention which is properly set out in the claims.

What is claimed is:

1. A superheat aviation gas turbine, comprising at least a compressor unit in direct communication with a primary combustor which in turn is in direct communication and on the same shaft with at least a compressor drive turbine;
   a power output turbine which is connected to and on the same shaft as the bypass fan;
   a second superheat combustion chamber connected to receive the working gas from the compressor drive turbine which adds sufficient heat to the working gas to bring the temperature ratio T2/T1 to within 15 percent of the adiabatic isentropic balance with the pressure ratio $(P2/P1)^{(K-1)/K}$ across the same power output turbine.

2. A superheat aviation gas turbine of claim 1 wherein there is positive control over the ignition of the fuel in the superheat combustion chamber.

3. A superheat aviation gas turbine of claim 1 wherein the combustion is stepped with 75-80 percent of the combustion in the primary combustion chamber and 20-25 percent of combustion is in the superheat combustion chamber.

4. A superheat aviation gas turbine of claim 1 wherein the increase in temperature during the superheat is 700° F. or less.

5. A superheat aviation gas turbine of claim 1 wherein the superheat combustion is ignited only after the power output shaft is rotating.

6. A superheat aviation gas turbine of claim 1 wherein the turbine process gas pressure drop in the superheat combustion chamber is less than 20 inches WC.

7. A superheat aviation gas turbine of claim 1 wherein an afterburner is added downstream of the power output turbine and which is augmented by a portion of the bypass air.

8. A superheat aviation gas turbine of claim 1 wherein the superheat combustion chamber system is added to older aviation gas turbine engines during overhaul.

9. A superheat aviation gas turbine of claim 1 wherein a low pressure compressor is added to the power output shaft next to the bypass fan to augment the high pressure compressor.

* * * * *